April 19, 1966 R. W. G. HUNT 3,246,586
FILTER CONTROL SYSTEM
Filed Nov. 27, 1963
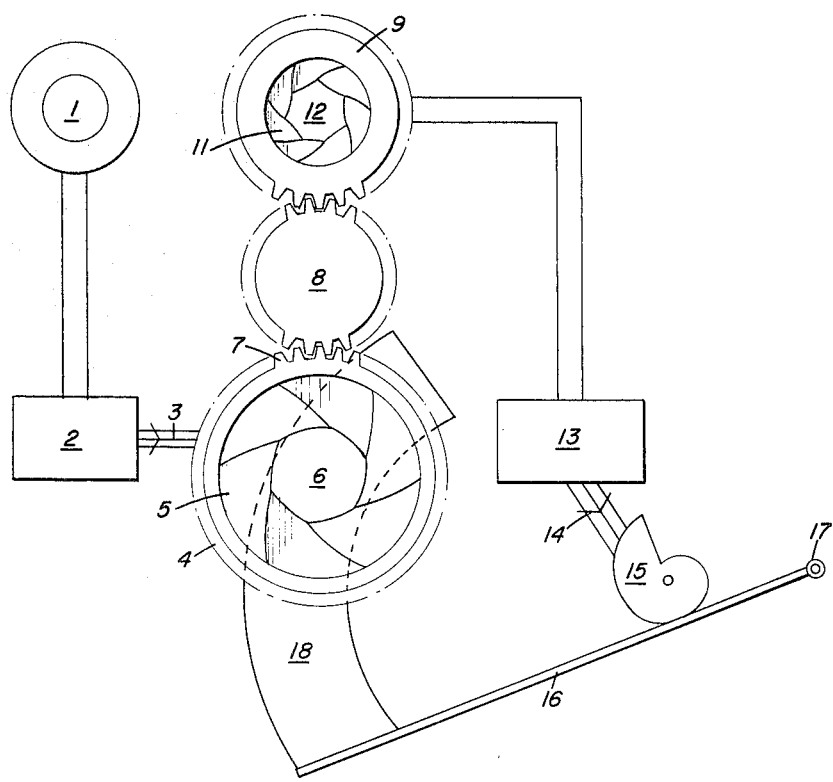
ROBERT W. G. HUNT
INVENTOR.
BY *R. Frank Smith*
*Robert W Hampton*
ATTORNEYS

United States Patent Office 3,246,586
Patented Apr. 19, 1966

3,246,586
FILTER CONTROL SYSTEM
Robert W. G. Hunt, Wealdstone, England, assignor to Eastman Kodak Company, Rochester, N.Y., a corporation of New Jersey
Filed Nov. 27, 1963, Ser. No. 326,413
Claims priority, application Great Britain, Aug. 26, 1963, 33,674/63
4 Claims. (Cl. 95—11)

This invention relates to color photography and more particularly to cameras for recording scenes illuminated with light of different color temperatures on color film which has been manufactured for recording scenes illuminated with light of one particular color temperature.

In the manufacture of light sensitive photographic materials for color photography, such as multi-layer color films, it is usually necessary to adjust the relative speeds of the light sensitive emulsions according to the type or color temperature of illuminant incident upon the scene to which they will ultimately be exposed.

In the case of commercially available tri-pack color materials they are commonly produced in forms balanced for "daylight" (6000° K.) for general use out-of-doors, "Type F" (4000° K.) for use with scenes illuminated by clear flashbulbs, "Type A" (3400° K.) for scenes illuminated by photoflood lamps and "Type B" (3200° K.) for scenes illuminated by high efficiency tungsten studio lamps. When it is necessary to use a film balanced for one type of illuminant to record a scene illuminated with an illuminant of a different color temperature, correcting filters are normally placed over the camera lens, the filters being such that the effective color of the illuminated scene is brought to that for which the film is balanced.

The above described procedure suffers from the defect that only approximate color correction is obtained unless the scene illuminants' color temperature is carefully measured with a color temperature meter before each exposure and the appropriate correcting filter chosen from an extensive set of such filters. In particular when the color correcting filter is selected merely on the basis of the type of scene illuminant and type of color film, no account is taken of the commonly occurring variations in the illuminant. Such variations comprise the lowering of the effective color temperature of sunlight at eventide when the sun is at a low angle, the changes in color temperature of an incandescent lamp due to supply voltage variations or the changes in color temperature of studio lamps due to filament evaporation; none of these variations is accurately estimatable by the operator alone.

The present invention provides a camera having at least two photoelectric means sensitive primarily to radiation in different spectral regions and variable filter means associated with the camera objective lens and responsive to the outputs of the photoelectric means, so that the average spectral content of the light passing through the lens is regulated.

The invention further provides a camera comprising an objective lens, two photoelectric means, one sensitive to light at the long wavelength end of the visible spectrum and the other sensitive to light at the short wavelength end of the visible spectrum, each adapted to receive light reflected from or incident upon any scene to which the camera is directed, variable filter means which are movable into the path of the light passing through the objective lens so as to increase or decrease the ratio of the intensities of the light in the long and short wavelength regions of the spectrum passing therethrough, electromechanical control means responsive to the electrical signals from the photoelectric means and coupled to the filter means so that the ratio of the intensities of the light in the long and short wavelength regions of the spectrum passing through the objective lens is kept nearly constant. The photoelectric means are preferably photoelectric cells of the photovoltaic or photoconductive type. The cells may be chosen so that their spectral sensitivity lies in the required regions of the spectrum or their spectral sensitivities may be modified by placing filters in the path of the light incident upon them. The electrical outputs from the photocells may operate the variable filter means directly or through some form of power amplifying device. Preferably the outputs of one or both the photocells are also used to control the aperture and/or the exposure time of the camera so as to automatically regulate exposure by compensating for variations in the overall level of scene brightness.

The electromechanical control means may be a moving coil meter movement or other electrical instrument which is operated by the electric current generated or modulated by the photoelectric means. Alternatively the electromechanical control means may comprise an electric motor operated in a closed-loop feedback system in response to the output of the photocells.

The variable filter means may be located in front of, behind or between the components of the camera objective lens so that the filtering action occurs evenly over the focused image at the camera film plane.

The variable filter means may comprise a filter wedge whose density increases continuously or in small steps along its length or, if the filter is located between the components of the objective, a filter of constant density and variable width.

In one embodiment of the invention a camera has two photoelectric means, one a photocell sensitive primarily to the red region of the visible spectrum and the other a photocell sensitive primarily to the blue region of the visible spectrum. Variable filter means are provided in the form of a blue-cyan graded filter or blue-cyan wedge and an orange graded filter or orange wedge. The blue-cyan filter is movable simultaneously both into the path of the light passing through the objective lens and the path of the light falling on the red sensitive photocell. The orange filter is movable simultaneously both into the path of the light passing through the objective lens and the path of the light falling on the blue sensitive photocell. Each photocell is provided with an indicating device or is coupled to the movable filter in the path of the light falling on it.

In operation each filter or wedge is adjusted so that the ratio of the intensities of the light in the red and blue regions of the visible spectrum passing through the objective lens is kept substantially constant. This adjustment may be made either by manual movement of each filter or wedge until predetermined outputs are indicated from the photocells or this adjustment may be made automatically by coupling the outputs of the photocells to the filters, for example by electromechanical control means responsive to the outputs of the photocells. If the blue-cyan filter absorbs light to which the blue sensitive photocell is responsive, errors will occur unless compensation for the effect is achieved by arranging that the blue-cyan filter also filters the light falling on the blue sensitive photocell. Similarly, if the orange filter absorbs light to which the red sensitive photocell is responsive, errors will occur unless the orange filter also filters the light falling on the red sensitive photocell. The color of the image light falling on the film in the camera when the filter adjustments have been carried out will correspond to that for which the film has been manufactured.

In an alternative embodiment of the invention a camera is provided with two photoelectric means as described above but whose electrical outputs are connected in opposition. The outputs from the photocells or the light incident upon them is suitably attenuated so that when the magnitudes of the outputs balance the color of the image light falling on the film in the camera corresponds to that for which the film has been manufactured. This balance is achieved by moving either a blue-cyan or an orange variable filter across the path of the light to the camera objective lens and the two photocells. The color of the exposing light is modified until the outputs of the photocells balance and the magnitudes of the balanced potentials may be used to assess and set the level of the exposure. This latter operation may be carried out manually or automatically.

If the film in the camera is chosen so that it is of a type balanced for use with the reddest or lowest color temperature illuminant which the operator is likely to encounter, all other illuminants may be accommodated by an appropriate degree of orange filtration in the optical path of the light passing through the camera objective lens. Accordingly, in a further embodiment of the invention a film is chosen which is balanced for use with a low color temperature illuminated scene and the variable filter means comprises a single filter or wedge providing a wide range of orange filtration.

The movements of the orange filter will not usually produce any significant effect on the output of the red sensitive photocell but will affect that of the blue sensitive photocell and movement of the filter may be carried out until the blue sensitive photocell's output corresponds to a predetermined value. This value will depend both upon the color of the incident light and upon its intensity so that it is necessary to eliminate the effect of scenelight intensity variations on the output of the blue sensitive photocell before adjusting the variable filter. The blue sensitive photocell may therefore be conveniently located behind the objective lens or behind a variable aperture which is moved in correspondence with that of the camera objective lens so that when the aperture of the objective is adjusted, in accordance with the output of the red sensitive photocell, to compensate for scene light variations the overall level of illumination on the blue sensitive photocell will remain constant. The color and intensity of the light falling on the film will thus be kept nearly constant by first setting the intensity by varying the aperture of the objective lens so as to obtain a predetermined output from the red sensitive photocell and thereafter moving the variable filter means until a predetermined output is obtained from the blue sensitive photocell. It is possible to reverse the procedure described in this paragraph by chosing a film which is balanced for use with the highest color temperature which is likely to be encountered and having a camera in which the variable filter means comprises a single filter providing a wide range of blue-cyan filtration. Since blue-cyan filters are less efficient than orange filters as they tend to absorb blue light it is necessary to provide some form of compensation such as by the use of a compensating variable filter of the type described in British Patent No. 886,557. Otherwise the light incident on or the output of the blue sensitive photocell, used to control the level of exposure in this embodiment, must be modified in accordance with the movement of the blue-cyan filter into and out of the path of the light passing through the objective lens; the red sensitive photocell will be located behind the objective lens or behind a variable aperture which is moved in correspondence with that of the camera objective lens.

In order that the invention may be more clearly understood one form thereof will now be described with reference to the accompanying drawing, in which the single figure represents a schematic layout of a camera according to the invention.

The exposure control and color control mechanism of a camera according to the invention has a photoelectric means sensitive to the long wavelength region of the visible spectrum, such as a photovoltaic cell covered with a red filter. The electrical output of the photoelectric means 1 is connected to an electromechanical control means 2 which provides a rotational drive, shown symbolically by the arrowed lines 3 to the aperture control ring 4 which drives the blades of an iris diaphragm 5 associated with a camera objective lens 6. The control ring 4 carries cogs 7 on its perimeter which engage the cogs of a gearwheel 8 coupled to a second aperture control ring 9 thereby transmitting any rotational movement from the control means 2 to the control ring 9. The aperture control ring 9 drives the blades of an iris diaphragm 11 associated with a second photoelectric means 12 sensitive to the short wavelength region of the visible spectrum, such as a photovoltaic cell covered with a blue filter.

The electrical output of the photoelectric means 12 is connected to an electromechanical control means 13 which provides a rotational drive, shown symbolically by the arrowed lines 14, to a cam 15. Rotation of the cam deflects an arm 16 against a restoring force such as a spring (not shown). The arm 16 is pivoted at one end 17 and carries a graded filter or filter wedge 18 at the other end, part of which covers the lens 6. The filter 18 has an absorption which is low or zero at the long wavelength end of the spectrum and which increases steadily towards the short wavelength end of the visible spectrum. The filter 18 is able therefore to modify the spectral content of light passing through it without appreciably altering its black body distribution of wavelength.

In operation the camera is loaded with a color film which has been balanced for use with scenes illuminated with light of the lowest color temperature which the operator is likely to encounter. The light reflected from a scene to be photographed will fall on the photocell 1, the photocell 12 and the lens 6. The light falling on the photocell 1 will cause the control means 2 to drive the aperture control ring 4 through the linkage 3 in proportion to its intensity. The aperture control ring 4 in turn drives the iris diaphragm 5 so that the image forming light falling on the lens 6 is adjusted to a constant predetermined level. The aperture control ring 4 also drives the aperture control ring 9 through the gear wheel 8 so that the iris diaphragm 11 alters the intensity of the light incident on the photocell 12. The light incident on the photocell 12 will always have a constant linear relationship to the intensity of the image forming light falling on the lens 6.

The output of the photocell 12 causes the electromechanical control means 13 to drive the cam 15 through the linkage 14 as a function of the intensity of the light incident on the photocell 12. The cam 15 drives the arm 16 which in turn pivots about the end 17 so that the filter 18 is located in the path of the light passing through the objective lens 6 at a point where its filtering action on the incident light is such as to ensure that the light incident on the film is of the type for which the film is balanced.

If the exposure time on the camera is altered, the control means 2 will be adjusted so that the iris diaphragm 5 is reset to make the product of the intensities and the time of the exposure given to the film constant. This resetting of the iris diaphragm 5 alters the intensities of the light falling on photocell 12 and it is therefore necessary when altering the control means 2 because of a change in exposure time also to alter control means 13 in such a way that the position of the filter 18 is independent of changes in exposure time and this can be accomplished by using a potentiometer or fixed resistors to attenuate the output of the photocell 12 so that it is inverse proportion to the exposure time.

If the exposure time on the camera is altered it is necessary to adjust the control means 2 so that its effect on the iris diaphragm 5 is such that the overall exposure, the product of light intensity and duration, given to the film in the camera remains constant. As the control ring 4 which controls the iris diaphragm 5 is also coupled by the gear 8 to the control ring 9 driving the iris diaphragm 11, adjustment of the control means 2 will affect the output of the photocell 12. Adjustment must therefore be made to the control means 13 so that the position of the filter 18 is not affected by alteration of the camera exposure time. This adjustment of the control means 13 may be made by alternating the electrical output of the photocell 12 in inverse proportion to the exposure time or by altering the coupling between the control means 13 and the cam 15.

I claim:

1. In a camera having an objective lens for focusing an image onto a photosensitive material of a given color temperature balance, the combination comprising: at least two photoelectric means sensitive to radiation in different spectral regions of the visible spectrum and adapted to receive incident scene light; variable unitary filter means movable into the ray path of said lens and responsive to the outputs of each of said photoelectric means to modify the ratio of the intensities of light in said different spectral regions passing through said lens, thereby maintaining the average spectral content of light passing through said lens substantially constant and corresponding to that for which the photosensitive material has been balanced; said filter means comprising a filter wedge movable in the path of the light passing through said lens.

2. In a photographic camera having an objective lens, the combination comprising: a diaphragm mechanism associated with said objective lens, a photoelectric means sensitive to the long wavelength region of the visible spectrum, mean responsive to the electrical output of said photoelectric means for positioning said diaphragm mechanism with respect to said objective lens, a second photoelectric means sensitive to the short wavelength region of the visible spectrum, means responsive to the positioning of said diaphragm mechanism for varying the electrical output of said second photoelectric means; variable filter means; means responsive to the electrical output of said second photoelectric means for positioning said variable filter means into the ray path of said lens to modify the ratio of the intensities of light in said long and short wavelength regions thereby maintaining the average spectral content of light passing through said lens substantially constant.

3. The combination according to claim 2 wherein said means responsive to the electrical output of said second photoelectric means comprises an electromechanical control means.

4. The combination according to claim 3 wherein said variable filter means is mounted for pivotal movement and said electromechanical control means drives a cam which engages said variable filter means to position same.

References Cited by the Examiner

UNITED STATES PATENTS

| | | | |
|---|---|---|---|
| 2,691,917 | 10/1954 | Curry | 88—24 |
| 2,742,837 | 4/1956 | Streiffert | 95—75 |
| 3,005,042 | 10/1961 | Horsley | 178—5.2 |

JOHN M. HORAN, *Primary Examiner.*